H. A. LAGE.
EARTH SCRAPER AND LEVELER.
APPLICATION FILED APR. 9, 1914. RENEWED AUG. 22, 1918.
1,296,295.
Patented Mar. 4, 1919.
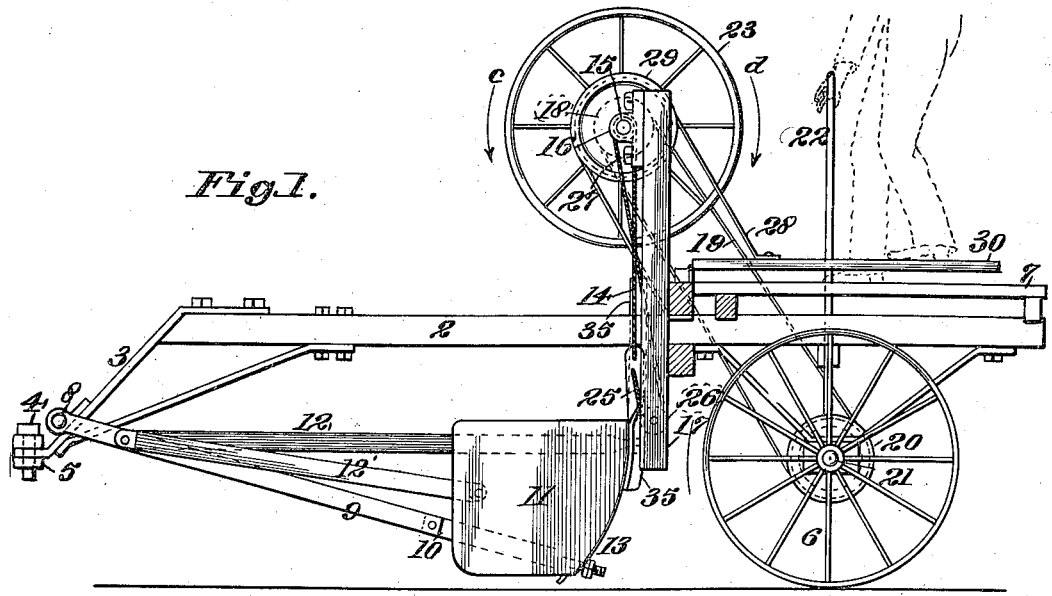
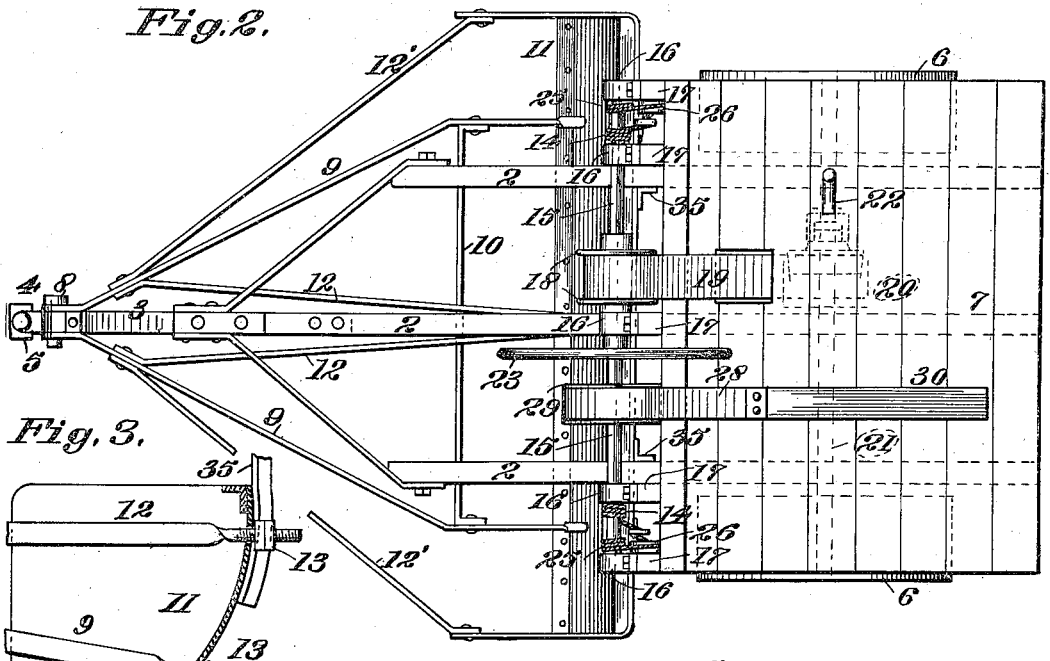
WITNESSES:
INVENTOR
Henry A. Lage
BY G. H. Strong
ATTORNEY

UNITED STATES PATENT OFFICE.

HENRY A. LAGE, OF MERCED, CALIFORNIA.

EARTH SCRAPER AND LEVELER.

1,296,295. Specification of Letters Patent. Patented Mar. 4, 1919.

Application filed April 9, 1914, Serial No. 830,657. Renewed August 22, 1918. Serial No. 251,010.

*To all whom it may concern:*

Be it known that I, HENRY A. LAGE, a citizen of the United States, residing at Merced, in the county of Merced and State of California, have invented new and useful Improvements in Earth Scrapers and Levelers, of which the following is a specification.

This invention relates to an apparatus for scraping, leveling and filling earth.

It is one of the objects of the present invention to provide a powerful, compact earth-scraping and leveling apparatus of large capacity, designed to be drawn by a traction engine, and to provide a scraper of such proportions as to be effective for economically and rapidly scraping, leveling and handling earth or earthy material; the apparatus being particularly designed for scraping and leveling fields, to remove small hummocks and fill cavities and holes, and which is particularly useful for "checking" field surfaces for irrigation purposes, as when a field is being prepared for planting to alfalfa.

Another object of the invention is to provide a power-driven mechanism consisting of means deriving power from the shaft of the trailer or carriage for elevating the scraper member.

The present invention comprehends a scraping and leveling apparatus in which the scraping member is pivotally connected to a trailer or carriage having substantially broad running wheels mounted on the rear of and within the vertical planes projected beyond the vertical sides of the scraper so that the running wheels of the carriage or trailer travel over a soil surface previously scraped or leveled by the preceding scraper, the advantage of this being that the running wheels will travel on the roadway or surface previously cut by the scraper, and thus there is no vertical movement of the trailer and its wheels as to the scraping member as would be the case were the scraping member narrower than the carriage of the wheel track, in which latter event the wheels would be allowed to run over hummocks or obstructions beyond the scraping gage of the scraping member. The invention further comprehends means whereby the effective operating and vertical position of the scraping member may be adjusted and fixed as to the trailer carriage for the purpose of varying the depth of cut of the scraper and for elevating it to the non-scraping position, this means including provisions for positively drawing the scraping member down in addition to its downward gravitating movement, and which provides for the imposing of the weight or a part of the weight of the trailer carriage upon the scraper so as to increase its scraping force and make the scraper effectively operative upon hard earth.

The invention consists of the parts and the construction and combination of parts as hereinafter more fully described and claimed, having reference to the accompanying drawings in which—

Figure 1 is a side elevation of the apparatus partly broken away.

Fig. 2 is a plan view of the apparatus.

Fig. 3 is a sectional detail of the scraper showing means for adjusting its angular position.

Fig. 4 is a diagrammatic view showing the movement of the running wheels over the trail.

The present invention embodies a trailer or carriage having a main horizontal frame 2 which projects forwardly and is provided with a tongue 3 adjustably connected by a king-pin or other suitable flexible connection 4 to the draw-bar 5 of a traction engine of suitable type.

Above the running wheels 6 on the frame 2 is provided a platform 7 on which an operator may stand for the control and manipulation of the apparatus.

Pivotally connected at 8 to the tongue 3 are forwardly convergent bars 9 transversely braced at 10, the rear ends of the bars 9 extending through the rear wall of a scraper 11, other suitable draw-bars and brace members 12 and 12′ being provided to stiffen and aid in drawing the scraper 11. The ends of the draw-bars 9 and 12 are shown in Fig. 3 as screw-threaded for the reception of nuts 13 which control the angular position of the scraper 11 which is adapted to be adjusted according to the nature of the soil being operated upon and its surface. By screwing the upper nuts 13 forwardly on the upper rod or rods 12 and turning the nuts 13 on the lower bars 9 rearwardly, the scraper is brought to stand nearer the vertical plane and conversely by screwing the nuts 13 on the lower rods forwardly and the nuts on the upper rod rearwardly the scraper 11 is caused to lean more toward the horizontal, and in which latter position there would be a greater quantity of the earth scraped allowed to repose upon the curved front surface of the scraper so that the gathered earth will be carried a greater distance, the distance of carriage of the earth being determined by the angularity of the scraper 11. The bars or members 12' serve as pivotal supports for the scraper which pivotal points are located in front or advance of the nuts 13 so that if the lower nuts 13 are loosened and the upper nuts 13 tightened, or vice versa, the scraper will be rocked upwardly or downwardly respectively, about its pivotal points of connection with bars 12'.

In Fig. 2 the scraper 11 is shown as projecting considerably beyond the maximum gage of the running wheels 6 so that during operation these wheels will always move in the cut path made by the leading scraper 11. This design is important and advantageous for the reason that in leveling or other surfaces the scraper 11 is adjusted according to the nature of the surface to be treated, and then when the tractor is started the scraper 11 will scrape off the high spots or hummocks of the surface, the scraped material being pushed or carried forwardly until deposited in a depressed portion, such as shown in the diagrammatic view, Fig. 4; and during the operation of the vehicle the wheels 6 would travel over the rearwardly leveled path-way cut by the scraper where a hillock was removed, and subsequently roll over the earth which was removed from the hillock at a and deposited in the depression b, it will be seen that there is a distinct co-operation between the running wheels 6 and the scraper 11, to the end that the scraper having been adjusted to a determined scraping position forms and levels a trail in which the following and running wheels 6 move. The running wheels operate over a substantially leveled road-way, and do not impart any vertical movement to the scraper 11 relative to the road-way formed. Were the road wheels 6 of greater transverse gage than the width of the scraper 11, then whenever the wheels 6 ran over a hummock or elevated obstacle there would be a tendency to lift the scraper 11, and similarly when running into depressions there would be a tendency on account of the vertical movement of the carriage 2 to lower the scraper 11, and these tendencies are entirely obviated by providing a scraper member of greater width than the gage of the road wheels.

By means of the pivotal or flexible connection 4 between the leading tractor or motive power, this may be permitted to rise or fall in consonance with the variations or undulations of the earth surface without imparting any material movement to the axle of the running wheels 6, for the reason that the scraper 11 is interposed between the tractor and the running wheels, and so prepares a level road-way for the wheels.

It is desirable that means be provided for elevating or lowering the scraper 11 by power other than manual, because of the considerable weight of the scraper member, owing to its size, and further to utilize the power of the tractor, and for the accomplishment of this purpose there are suitably connected to the scraper 11 elevating connections such as cables 14, which extend upwardly and are wound upon drums or winding portions of a transverse counter-shaft 15, mounted in suitable bearings 16 on upright posts 17 of the carriage 2. Secured upon the shaft 15 is a suitable wheel 18 driven by suitable means as a belt 19, running downwardly to and engaging a driving friction pulley 20, mounted on the axle 21 of the wheels 6, one or the other of which may be loose on the axle to permit compensation when the carriage 2 swings in turning.

A suitable clutch device, including an operating lever 22 is provided whereby friction wheel 20 may be operatively connected to the shaft 21 when it is desired to rotate the counter-shaft 15 for winding the lifting cables 14 to lift the scraper 11, the friction wheel 20 being coupled to the shaft 21 when the operator throws the clutch lever 22 to operably connect the same.

Secured upon the shaft 15 is a large hand wheel 23 which may be utilized for turning the shaft 15 in either direction when desired. The hand wheel 23 being particularly provided for turning the shaft 15 in the direction reverse to that in which it is revolved by power derived from the running gear axle 21, which when coupled by the clutch mechanism 22 drives the shaft 15 in the direction indicated at arrow c, Fig. 1, so as to wind the lifting cables 14 and elevate the scraper 11, this usually being accomplished while the carriage 4 is being carried forward.

Under some conditions, as when operating over an earth surface of hard character, it is desirable in order to make the scraper bite effectively that an additional load can be imposed upon the scraper to produce the increased cutting efficiency, and to that end there is suitably connected to the scraper 11 means having the effect of forcing the scraper downwardly with increased pressure, this being accomplished by imposing upon the scraper a portion or all of the weight of the carriage 2. This means includes in this construction, cables 25 which extend downwardly from their connection with the scraper 11 and pass around the direction pulleys 26, thence run upwardly at 27 and around the counter-shaft 15 in a direction opposite to the winding of the lifting ropes 14, so that when an operator turns the hand-wheel, as indicated by the arrow d, then the cables 25 would be wound upon the shaft 15 and tend to lift the carriage 2 and impose its load upon the scraper 11. It will thus be seen that the operator during the travel of the carriage 2 can quickly throw the clutch-lever 22 so as to couple the friction wheel 20 to its shaft or axle 21, and through means of the connection of belt 19 revolve the counter-shaft 15 to cause the winding of the lifting ropes 14 thereon, and elevate or raise the scraper 11, the entire operation being accomplished by power derived from the tractor. Having lifted the scraper 11 to the position shown in Fig. 1, it may be retained there as long as desired by the application of pressure of a brake-band 28 to the brake-wheel 29 secured on the counter-shaft 15, the brake-band being connected to a brake-lever 30, operated by the foot of an operator. By removing pressure from the brake-lever 30 at the desired time, the scraper 11 will automatically, under the force of gravity, move downwardly into scraping position, the depth of cut being determined by the position the scraper 11 is allowed to assume, it being controlled and held in the desired position by the brake 28.

When operating over hard earth in the event that the weight of the scraper *per se* is insufficient to penetrate into the soil, then the operator may grasp the hand wheel 23 and revolve same in the direction of arrow $d$, Fig. 1, which would simultaneously slacken up the cables 14 and wind the tension cables 25 with the resultant effect of tending to lift the carriage 2 by reason of the shortening of the cables 25 about the guide pulleys 26, the weight of the carriage 2 being transmitted to the scraper 11 in such degree as may be necessitated by the hardness of the soil.

For preventing lateral movement of the scraper 11 as to the carriage 2, suitable uprights 35 are connected to the back of the scraper and are adapted to project upwardly in juxtaposition to adjacent members of the frame 2, in such relation that the stop-bars 35 will slide against the frame members to prevent lateral play.

By reference to Fig. 1, it will be observed, that the point of connection 8 of the draw-bars 9 and 12 with tongue 3 is located above the point of connection of the tongue 3 with the tractor and also above the axis of rotation of wheels 6 and consequently above the horizontal line of draft of the machine, with the result that the scraper 11 will, when in operation, effect a pull on the frame 2 and therewith wheels 6 toward the ground, as distinguished from a tendency of the scraper to lift the wheels 6 up from the ground.

There is a further advantage in connection with the flexible suspension devices for the scraper and the pivoted connections for the draft bars both with the scraper and the frame, which is found in the fact that vibratory movements of the frame, imparted by the rise and fall of the draft vehicle over uneven ground, are not transmitted to the scraper, and, therefore, the angular position of the latter at work remains substantially constant and there is not present any variable depth of cutting such as would be caused if the suction or pitch of the blade were undergoing continual disturbance.

A further feature of importance, also, where positive means are provided for depressing the scraper, is the yielding or frictional brake device for holding the scraper to its work. A positive lock for this purpose would be disastrous to the machine, whereas the present device is sufficiently secure for normal conditions and will yield to permit the scraper to ride over obstructions.

The draft links of the scraper are pivotally connected to the tongue 3 of the wheeled frame at the front end of frame. This makes the draft of the scraper independent of the wheeled frame. The draft comes through the tongue of the frame, but not through the side bars of the frame. The frame is merely used to raise or lower the blade and trails along at the rear of the scraper for that purpose only. In other words the draw links 9, 10 and 12 of the scraper 11, are connected to the tongue 3 of the frame 2. Then the draft is transmitted through tongue 3 to links 9, 10 and 12 to the scraper, not through tongue 3, to frame 2 to links 9, 10 and 12 to the scraper. This is an advantage possessed by this scraper over other wheeled scrapers of somewhat similar appearance.

Having thus described my invention, what I claim and desire to secure by Letters Patent is:

1. In an earth scraper, a frame, a scraper, rigid means borne by the frame for providing a pivotal support for the front portion of the scraper to prevent bodily forward movement of the latter, rods connected at their forward ends to the frame and having their rear portions disposed above and below said pivotal point and connected to the scraper, and adjusting means carried by said rear ends of the rods and engaged with the rear end of the scraper so that loosening and tightening of the respective adjusting means will rock said scraper about said pivotal support of the scraper.

2. In an earth scraper, a horizontal frame, wheels supporting the rear of said frame, a downwardly extending member at the front of the frame, a scraper between said wheels and member, rigid elements connected to the frame and extending downwardly therefrom and engaged with the back of the scraper, draw bars connected at their front ends to said member and being divergent at their rear ends and connected to the scraper bottom, draw bars connected at their front ends to the first named draw bars and diverging at their rear ends and connected to the scraper ends at points substantially central between the scraper top and bottom, and draw bars connected at their front ends to the first named draw bars and converging at their rear ends and connected to the scraper back at substantially the center of the length of the latter.

3. In an earth scraper, a wheeled frame, a scraper in front of the wheels, draw bars connected at their front ends to the front of the frame and having their rear ends connected to the ends of the scraper at points substantially midway between the scraper top and bottom, draw bars between the first named draw bars having connection at their front ends with the frame front and having their rear ends connected to the scraper bottom, draw bars between the second named draw bars having connection at their front ends with the frame and connected at their rear ends to the scraper back at approximately the center of the length of the scraper, and means to adjustably support the rear of the scraper from the frame.

4. In an earth scraper, a frame having wheels at its rear, a scraper in front of the wheels having its ends turned to extend forwardly, draw bars connected to the frame front and to the front sides of said ends of the scraper, draw bars having connection with the frame front and at their rear ends connected to the scraper bottom at points between the first named draw bars, draw bars having connection with the frame front and at their rear ends connected to substantially the center of the length of the scraper, and means to adjustably support the scraper from the frame.

5. In an earth scraper, a wheeled frame, a scraper in front of the wheels of the frame, means to adjustably support the scraper from the frame, convergent draw bars connected at their rear ends to the end parts of the scraper, convergent draw bars having their rear ends connected to the scraper at points spaced from and between the connections of the first named draw bars with the scraper, draw bars having their rear ends connected to substantially the center of the length of the scraper, the points of connection of each of the first, second and third named draw bars being located in different planes so as to obtain a draw on the scraper which occurs at points adjacent the top, bottom and intermediate parts of the scraper, and means to connect the front ends of all of the draw bars to the frame front.

In testimony whereof I have hereunto set my hand in the presence of two subscribing witnesses.

HENRY A. LAGE.

Witnesses:
NATHANIEL C. RAY,
S. F. B. MORSE.